(12) United States Patent
Hsieh et al.

(10) Patent No.: US 7,444,535 B2
(45) Date of Patent: Oct. 28, 2008

(54) METHOD AND RELATED APPARATUS FOR ADJUSTING TIMING OF MEMORY SIGNALS

(75) Inventors: Bowei Hsieh, Taipei Hsien (TW); Ming-Shi Liou, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 314 days.

(21) Appl. No.: 10/905,903

(22) Filed: Jan. 26, 2005

(65) Prior Publication Data

US 2006/0080565 A1    Apr. 13, 2006

(30) Foreign Application Priority Data

Oct. 13, 2004    (TW) .............................. 93131046 A (51) Int. Cl.
*G06F 1/04* (2006.01)
(52) U.S. Cl. ..................... 713/600; 713/401; 713/500; 711/100
(58) Field of Classification Search ................ 713/400, 713/401, 500, 501, 503, 600; 714/5, 42, 714/702, 718; 711/100
See application file for complete search history.

(56) References Cited

U.S. PATENT DOCUMENTS

| | | | | |
|---|---|---|---|---|
| 4,079,456 A | * | 3/1978 | Lunsford et al. ............ | 713/401 |
| 5,034,967 A | * | 7/1991 | Cox et al. .................... | 375/373 |
| 5,577,236 A | * | 11/1996 | Johnson et al. ............. | 713/400 |
| 5,944,833 A | * | 8/1999 | Ugon ........................... | 713/400 |
| 6,477,656 B1 | * | 11/2002 | Takaki et al. ................. | 713/401 |
| 6,647,506 B1 | * | 11/2003 | Yang et al. ................... | 713/503 |
| 6,859,885 B2 | | 2/2005 | Wagner | |
| 7,181,639 B2 | * | 2/2007 | Chua-Eoan et al. ......... | 713/600 |

FOREIGN PATENT DOCUMENTS

JP       01140358 A   *   6/1989

* cited by examiner

*Primary Examiner*—Mark Connolly
(74) *Attorney, Agent, or Firm*—Winston Hsu (57) ABSTRACT

A method and related apparatus for adjusting/calibrating timing of memory signals. In a preferred embodiment of the invention, reference signals of the same frequency and different phase are generated by a phase-lock loop. These reference signals are used to trigger sampling of signals for generating signals of different timing/delay; then timing/delay of memory signals, such as clock, command, data and data strobe, can be adjusted and calibrated. In this way, the invention can avoid the use of delay lines while adjusting/calibrating memory signals, so as to reduce the negative effects of characteristics shift and variation of delay lines.

16 Claims, 8 Drawing Sheets

METHOD AND RELATED APPARATUS FOR ADJUSTING TIMING OF MEMORY SIGNALS

BACKGROUND OF INVENTION

1. Field of the Invention

The invention relates to a method and related apparatus for adjusting timings of memory signals, and more particularly, to a method and related apparatus of utilizing signals having the same frequency but different phase of a phase locked loop (PLL) to adjust timings of the memory signals.

2. Description of the Prior Art

Computer systems have become one of the most important hardware foundations in today's information society. Therefore, improving the efficiency of computer systems has become a major goal.

As known by those skilled in the art, a computer system comprises a CPU, a memory (such as DRAM), a chipset, etc. The CPU controls the execution of programs and calculation of data and numbers. The above-mentioned data, programs and numbers can be stored in the memory. The chipset is placed between the CPU and the memory for managing the CPU (or other devices of the computer system) to access the memory.

The chipset is electrically connected to the memory through a bus, and controls the data access of the memory through signals of the bus. To control the memory operation timing the chipset has to provide memory clocks to the memory. The chipset has to send command signals in co-ordination with the timing of the memory clocks in order to control the memory to write and/or read data, or to perform other operations such as paging. When the chipset and the memory have to perform a data transmission operation, other signals have to be utilized. For example, when data has to be stored in the memory via the chipset, the chipset not only sends a data signal for transferring data to be stored, but also sends a data indication signal in co-ordination with the timing of the memory clocks to indicate when the memory can receive the data to be stored.

In order to complete the access control of the memory correctly, the above-mentioned signals, including the memory clocks, command signals, data signals, and data indication signals, need to have appropriate timing relationships. For example, the data indication signal can align triggering edges (such as rising edges) of the memory clocks, and these triggering edges of the memory clocks and the data indication signals can trigger the memory to receive the command signals and the data signals between set-up time and hold time.

In real implementations, however, there are many factors which confuse the above-mentioned normal timing relationship. When the chipset has to transfer the electronic signal to the memory, the memory can be regarded as a circuit load of the chipset. This means that different memory arrangements form different circuit loads and further influence the timing of data transmission. In different memory arrangements, the memory connected to the same bus may comprise only one single-inline memory module (SIMM) or comprise two double-inline memory modules (DIMM). For the chipset, the two-DIMM memory arrangement forms a larger circuit load, therefore, when the signal is transferred into the two-DIMM memory, the signal may be delayed more, meaning that signals generated by the chipset to the memory may not have the correct and appropriate timing relationship.

In order to ensure all signals generated by the chipset to the memory do have the correct timing relationship, when the computer system is booting, it performs a timing adjusting operation on all the above-mentioned memory signals generated by the chipset, so as to compensate timing confusion due to non-ideal factors. In the prior art, this timing adjusting operation utilizes different programmable delay lines to inject a corresponding delay time to each memory signal respectively so that memory signals can maintain corresponding timing relationships. For example, if the triggering edge of the data indication signal does not align the triggering edge of the memory clock, the delay line can be utilized to delay the data indication signal so that the delayed data indication signal will properly align the memory clock.

There are some disadvantages in utilizing the delay line, however. The parameters of semiconductor procedures vary (e.g. the doping concentration varies), or the temperature of the system varies (according to location, season or specific operation of the system). These factors may cause the injected delay time of each delay line to vary so that the delay line cannot inject a predetermined delay time and consequently the memory signals will not have correct timing relationships. In general, a programmable delay line can utilize a predetermined delay time td as a unit to selectively delay a signal 1*td, 2*td, 3*td etc. But if the delay time varies, the real injected delay time may be 1*(1−5%)td, 2*(1−5%)td etc. For example, when adjusting timing of the memory signals, if the chipset has to delay a signal k*td so that all signals can have correct timing relationships, the chipset programs a corresponding delay line to delay the signal. But if the characteristic of the delay line varies, the delay line may only inject a k*(1−5%)td time delay. There is an error of k*5%*td which may ruin the timing relationships. Furthermore, different delay lines are used for delaying different signals and the time delay error of these different delay lines may be different. This also confuses the timings of the memory signals. Moreover, the delay line may inject other negative influences (such as a jitter phenomenon) to the signals.

SUMMARY OF INVENTION

The invention provides a method and related apparatus for utilizing reference signals having the same frequency but different phase to adjust timings of memory signals in order to solve the above-mentioned problem.

The method for adjusting timing of signals of the present invention comprises: generating a plurality of reference signals, all having the same frequency but different phase; selecting a first reference signal from the reference signals; and adjusting a first signal output delay time according to the first reference signal to make the first signal delay be outputted.

Furthermore, the adjusting circuit for adjusting timings of memory signals of a computer system comprises: a clock generator for generating a plurality of reference signals, all having the same frequency but different phase; a multiplexing unit connected to the clock generator for receiving the reference signals, wherein the multiplexing unit selects a first reference signal according to a selecting signal; and an adjusting unit connected to the multiplexing unit for receiving a signal and delaying the output of the signal according to the first reference signal selected by the multiplexing unit.

The present invention can utilize the reference signals sampling/triggering technique to adjust timings of memory clocks and command signals. When accurately adjusting the data indication signal and the data signal, the present invention can utilize the above-mentioned reference signals sampling/triggering technique to firstly adjust the timing and secondly utilize delay lines to tune the timing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
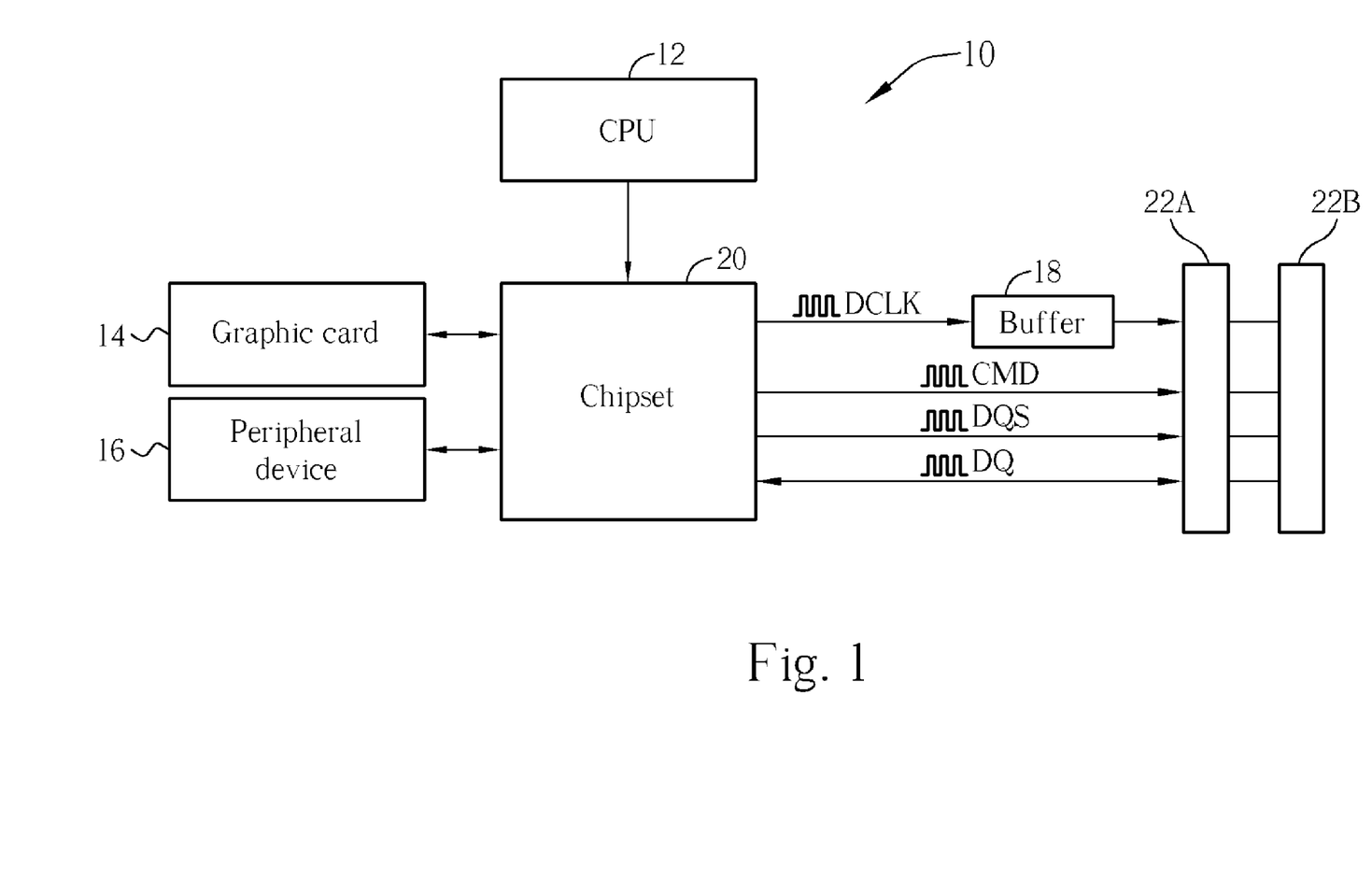
FIG. 1 is a block diagram of a computer system according to the present invention.

Please refer to FIG. 1, which is a block diagram of a computer system 10. The computer system 10 comprises a CPU 12, a chipset 20, a graphic card 14, a peripheral device 16 (please note that the number of peripheral devices is not limited and here the one peripheral device 16 is only utilized for an illustration), and two memory slots 22A and 22B capable of comprising a memory module and integrating the memory modules respectively placed on the memory slots into the memory of the whole computer system 10. The chipset 20 is utilized for managing the memory to make the CPU 12 capable of accessing memory data through the chipset. Other devices, for example, the graphic card 14 for processing graphic data and the peripheral device(s) 16 (such as hard disk drive, optical disk drive, network card, and etc.) can exchange data with the CPU 12 and memory through the chipset 20.

For managing and controlling data access of the memory, the chipset 20 can set up one or multiple channels, and is electrically connected to each memory slot through these channels. As shown in FIG. 1, the chipset 20 can be electrically connected to the memory slots 22A and 22B through the bus of the same channel. Furthermore, the chipset 20 can transfer memory signals including the clock DCLK, the command signal CMD, the data indication signal DQS, and data signal DQ in order to control the operation of memory modules on the memory slots 22A and 22B. Here, the clock DCLK is utilized as a memory clock for controlling the timing of the operation of each memory module, the command signal CMD is utilized to send a command to each memory module to control each memory module to perform a needed operation (for example, store data in a specific address of the memory module, read data from the memory module, or perform a paging operation on the memory module), and the data indication signal DQS is utilized to indicate the timing of data transmission. As shown in FIG. 1, in order to maintain the accuracy of the clock DCLK, the clock DCLK often firstly passes through a buffer 18 for signal buffering (such as for enhancing the driving ability) and is then transferred to the memory slots 22A and 22B.

Figure 2:
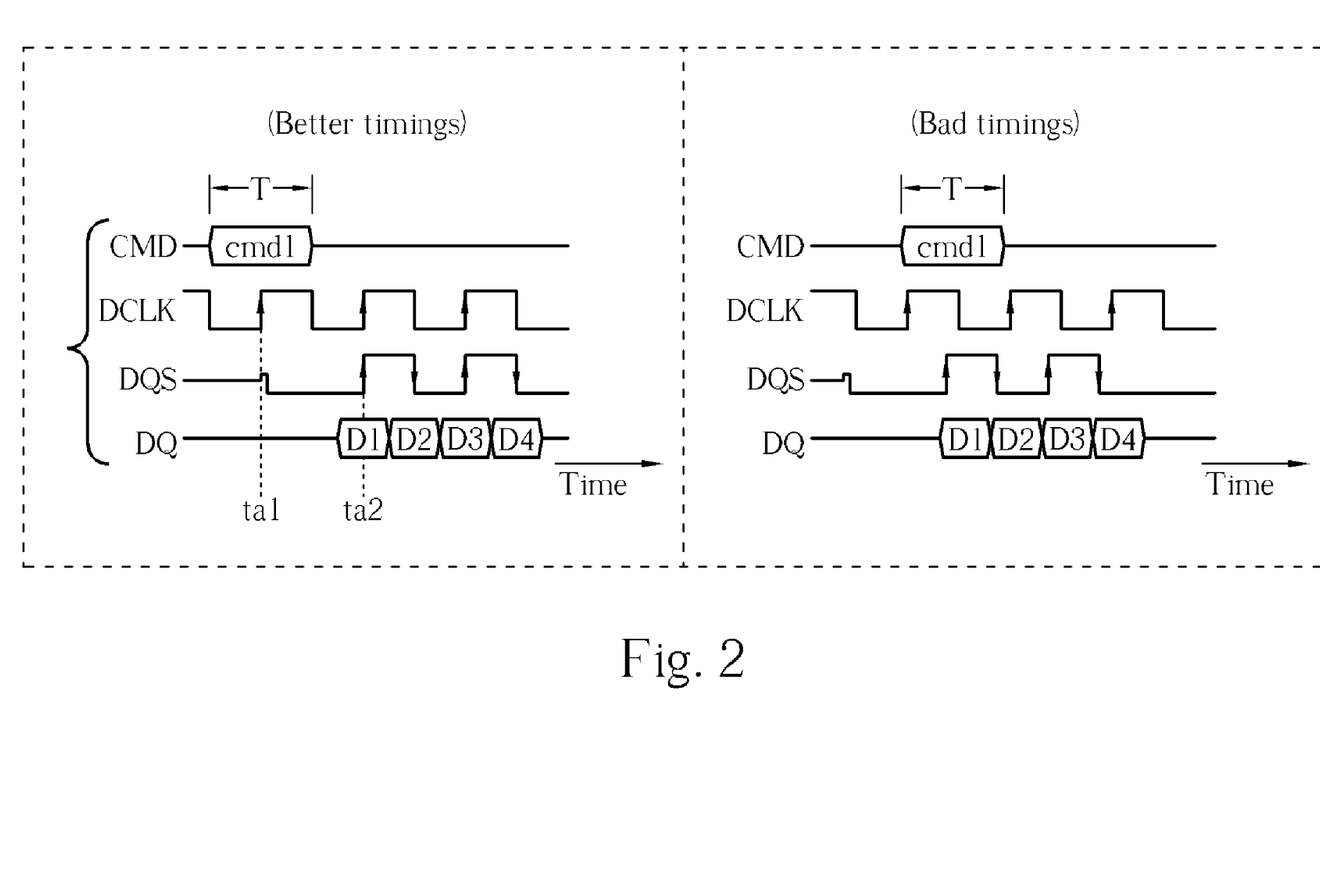
FIG. 2 is a timing diagram illustrating memory signals when the computer system shown in FIG. 1 operates.

Please refer to FIG. 2 (in conjunction with FIG. 1). FIG. 2 is a timing diagram illustrating memory signals when the computer system shown in FIG. 1 operates. As shown in FIG. 2, the horizontal axis represents time. As mentioned above, for accurately controlling data access of the memory, the above-mentioned memory signals must have correct timing relationships. (The correct timing relationship is shown in the left area of FIG. 2.) In the correct timing relationship, the triggering edge (in this case, the rising edge) of the clock DCLK (whose period is T) can trigger each memory module to sample the most stable position of the command signal CMD (i.e., the middle of the command signal CMD). That is, it can prevent the memory module from sampling the start, the end, or an unstable position of the command signal CMD. Furthermore, if the correct timing is utilized, the rising edge of the data indication signal DQS can align the rising edge of the clock DCLK. Therefore, in co-ordination with the rising edge and the falling edge of the data indication signal DQS, the data signal DQ can be utilized to transfer data. In FIG. 2, we assume that each memory module is a double data rate (DDR) memory module. Therefore, the data signal DQ can transfer one datum per half period. In the correct timing relationship, the operation of coordinating each memory signal can be illustrated as follows. First, at time ta1, the memory module installed in the memory slot can be triggered by the clock DCLK to sample the command signal CMD to get the command cmd1. Assuming that the command cmd1 indicates to write data into the memory module, the data indication signal DQS starts a low-level signal (whose period is T from time ta1) as a preamble signal. This represents that the chipset 20 has started to transfer data. At time ta2, the chipset 20 operates in co-ordination with the data indication signal DQS and starts to utilize the data signal DQ to transfer data D1-D4 to be written to the memory module. Furthermore, in coordination with the rising edge and falling edge of the data indication signal, the memory module can receive data D1-D4 and store it.

But, because of the previously mentioned non-ideal factors, the memory signals will not have correct timing relationships. As mentioned above, different memory arrangements form different loads of the chipset and further influence the timing of the signal transmission. If only one of the memory slots 22A and 22B has a SIMM memory module, the load is small and the signal transferred to the memory module is delayed a little. If, however, the memory slots 22A and 22B both comprise a DIMM memory module, the two DIMM memory modules form a larger circuit load of the chipset 20. Therefore, under this memory arrangement, the signal transferred to the memory module may be delayed more and confuse the timing of the memory signals. In the right area of FIG. 2 is shown a bad timing relationship. Because timings of the command signal CMD and the clock DCLK are confused, when the memory module samples the command signal CMD in the rising edge of the clock DCLK, the memory module may sample an unstable position of the command signal CMD and the correct command cmd1 cannot be received. Even if the memory module correctly receives the command cmd1 (assuming that the command cmd1 is a write-in command), when the memory module starts to receive data from the chipset, the memory module cannot receive the data D1-D4 to be written according to the indication signal DQS because the data indication signal DQS is not aligned well with the clock DCLK. This is because when the memory module receives a write-in command, the memory module must receive the data to be written in a fixed time so that the data can be written correctly. If the memory module receives the data before receiving the write-in command (too early), or a long time after receiving the write-in command (too late), the memory module cannot correctly store the data.

Figure 3:
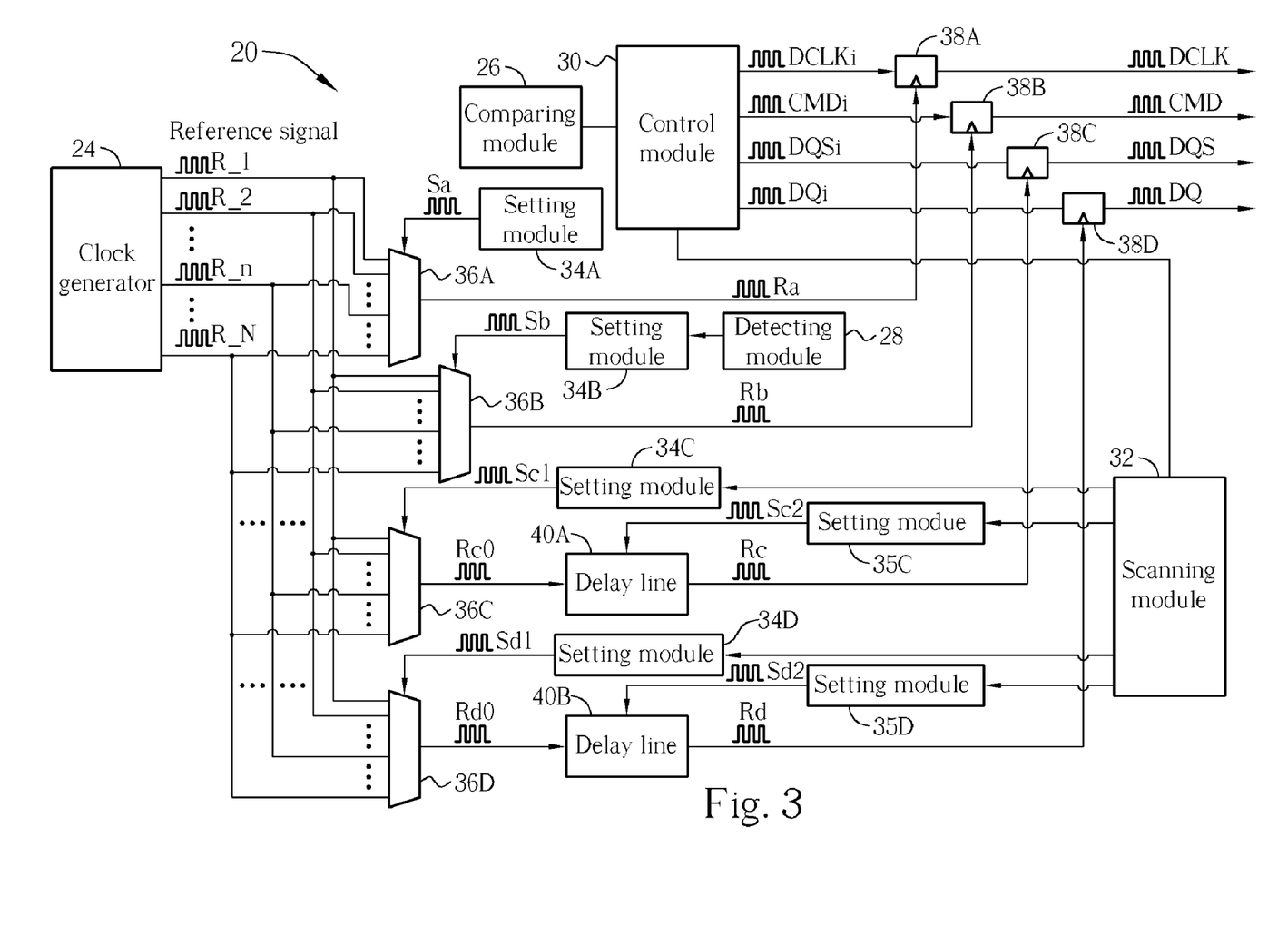
FIG. 3 is a block diagram illustrating when the chipset shown in FIG. 1 accomplishes the timing adjusting mechanism according to the present invention.

In order to prevent this confusion of the timing relationships among the memory signals, the chipset has a related timing adjusting mechanism. This means that the chipset can adjust the timings of the memory signals when the computer system is turned on. Please refer to FIG. 3 (in conjunction with FIG. 1). FIG. 3 is a block diagram illustrating when the chipset 20 shown in FIG. 1 accomplishes the timing adjusting mechanism according to the present invention. The chipset 20 comprises a control module 30, a clock generator 24, multiplexer units 36A-36D, adjusting units 38A-38D, setting modules 34A-34D, and 35C-35D, programmable delay lines 40A-40B, a detecting module 28, a comparing module 26, and a scanning module 32. The control module is utilized for controlling the function of the chipset 20 and generating the inner clock DCLKi, the command signal CMCi, the data indication signal DQSi and the data signal DQi of the chipset 20. The adjusting units 38A-38D are respectively utilized for adjusting the timings of the signals to correspondingly generate the clock DCLK, the command signal CMD, the data indication signal DQS, and the data signal DQ as the memory signals of each memory module. The clock generator 24 can be a PLL, for example, a PLL comprising a ring oscillator for generating N reference signals R_1, R_2, ..., R_N, all having the same frequency but different phase. Each multiplexer unit 36A-36C can respectively receive a selecting signal Sa-Sb, and Sc1-Sc2 for selecting a reference signal from the N reference signals according to the selecting signal. The clock generator 24, the multiplexer units 36A-36D, the delay lines 40A-40B, the adjusting units 38A-38D, the control module 30, the setting module 34A-34D, and 35C-35D, the detecting module 28, the comparing module 26, and the scanning module can be combined to accomplish a computer system memory signal timing adjusting circuit to achieve the purpose of adjusting the memory signal timings.

According to the selected reference signals Ra and Rb selected by the multiplexer units 36A-36B, the adjusting units 38A-38B can respectively adjust the timings of the clock DCLKi and the command signal CMDi. Furthermore, for tuning timings of the data indication signal DQSi and the data signal DQi, the reference signals Rc0 and Rd0 selected by the multiplexer units 36C and 36D can first pass through the programmable delay lines 40A and 40B to delay their timings so that delayed reference signals Rc and Rd are generated. Therefore, the adjusting units 38C and 38D can adjust the timings of the data indication signal DQSi and data signal DQi according to the reference signals Rc and Rd. The delay lines 40A and 40B can be controlled by the selecting signals Sc2 and Sd2 to set delay times. Each set of selecting signals, Sa-Sb, Sc1-Sd1, Sc2-Sd2, is generated by the selecting modules 34A-34D, 35C-35D. These setting modules can be registers, which can control corresponding multiplexer units or delay lines through corresponding selecting signals according to the data stored in the registers. Furthermore, the data to be stored in the setting module can be determined by the control module 30, detecting module 28, and scanning module 32.

Figure 4:
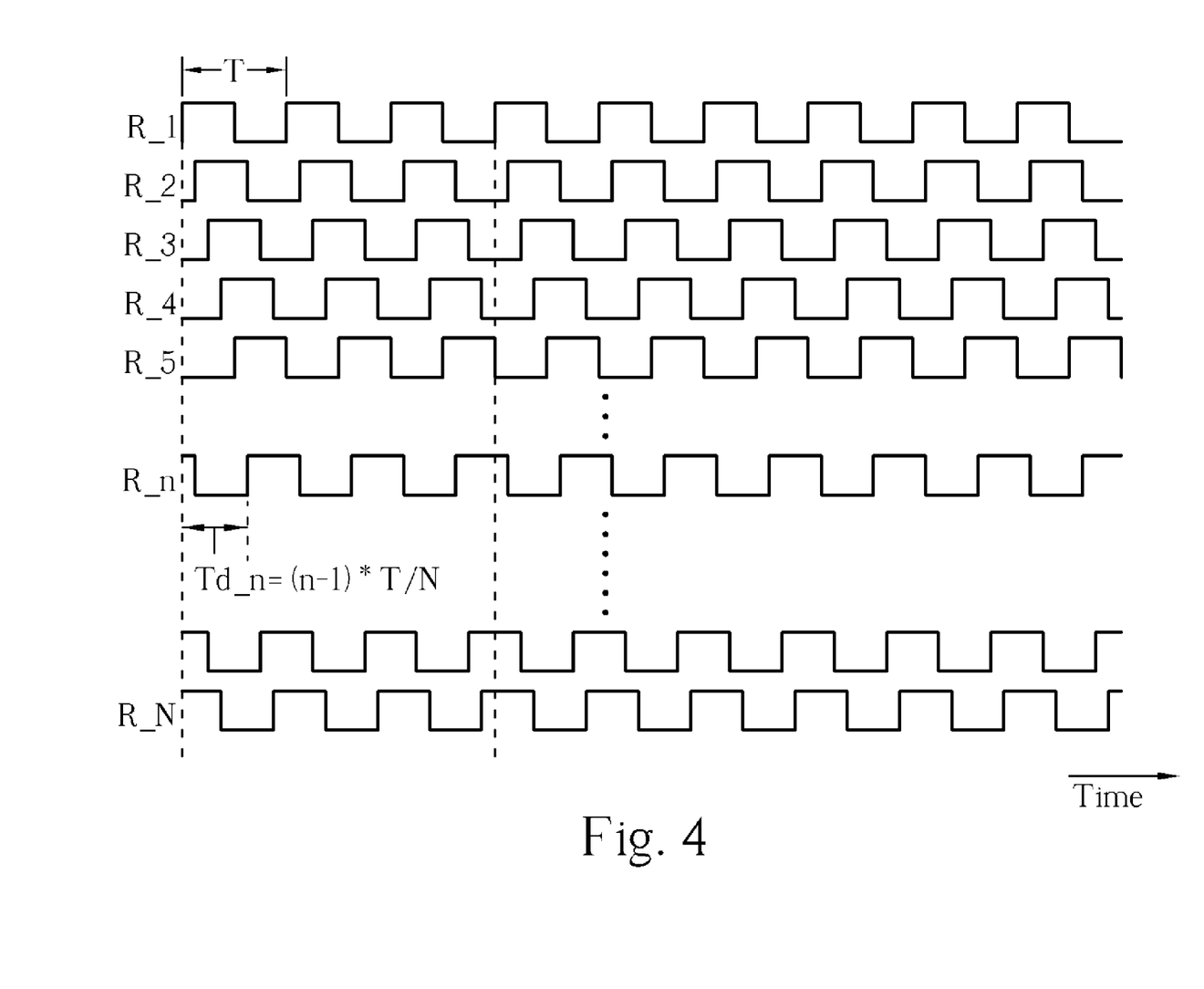
FIG. 4 is a timing diagram of each reference signal shown in FIG. 3.

In order to further illustrate the operation of timing adjustment of the chipset 20, please refer to FIG. 4 (in conjunction with FIG. 3). FIG. 4 is a timing diagram of each reference signal shown in FIG. 3. FIG. 4 shows N reference signals R_1, R_2, ..., R_N generated by the clock generator 24. In FIG. 4, the horizontal axis is time. The period of the reference signals is T (T is the period of the memory clock), but the phases of the reference signals are averagely distributed in the 360 degrees, and the phase difference can be regarded as the delay time. For example, corresponding to the rising edge of the first reference signal R_1, the rising edge of the $n_{th}$ reference signal R_n has a (n−1)*T/N delay time. As shown in FIG. 4, in the preferred embodiment, the clock generator 24 can generate 8 reference signals (that is, N=8).

Figure 5:
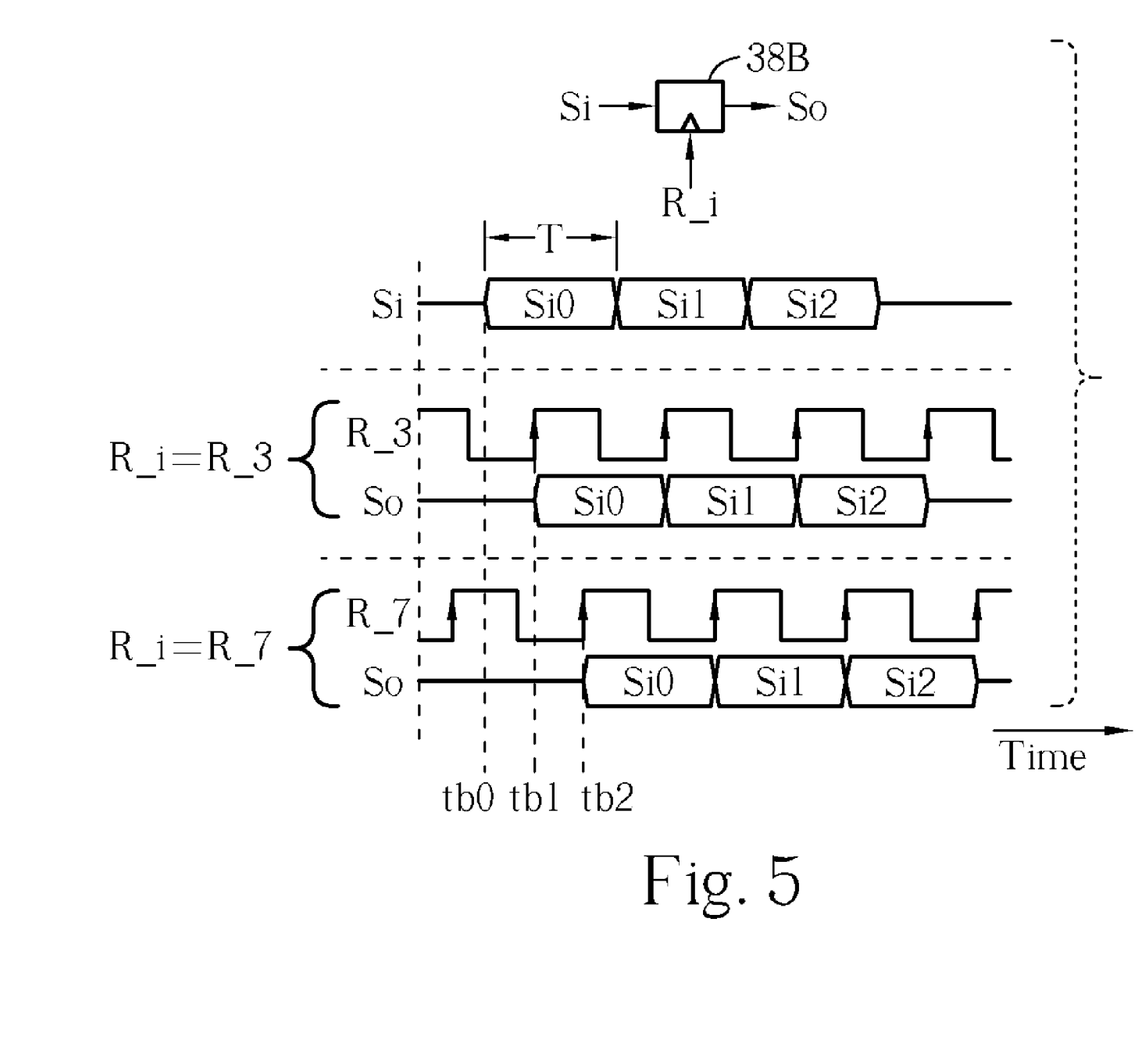
FIG. 5 and FIG. 6 are diagrams illustrating operations of each adjusting unit shown in FIG. 3.

FIG. 5 and FIG. 6 are diagrams illustrating the operations of each adjusting unit shown in FIG. 3. Please refer to FIG. 5 (in conjunction with FIG. 3 and FIG. 4). FIG. 5 illustrates the operation of the adjusting unit 38B. The adjusting unit 38B can comprise one or multiple flip-flops, which can be triggered by the reference signal R_i to sample an input signal Si to obtain a corresponding output signal So. As shown in FIG. 5, if the input signal Si has three data Si0-Si2 (where the period of each is T) at time tb0, and the reference signal R_i is the reference signal R_3, the adjusting unit 38B orderly starts to sample according to the rising edges of the reference signal R_3 in order to obtain a corresponding output signal So. This makes the output signal So start to transfer data Si0-Si2 after time tb1. In other words, when the adjusting unit 38B is triggered by the reference signal R_3, the output signal So is equivalent to delaying the input signal Si from time tb0 to time tb1. Similarly, for the same input signal Si, if the adjusting unit 38B receives the reference signal R_instead of the above-mentioned reference signal R_3, the output signal is equivalent to delaying the input signal Si from time tb0 to time tb2. The time difference between time tb1 and time tb2 corresponds to the phase difference between the reference signal R_3 and the reference signal R_7. Therefore, selecting different reference signals to trigger the adjusting unit 38B is equivalent to delaying the input signal Si a certain time. The present invention utilizes the above-mentioned method to adjust the timings of the memory signals.

Figure 6:
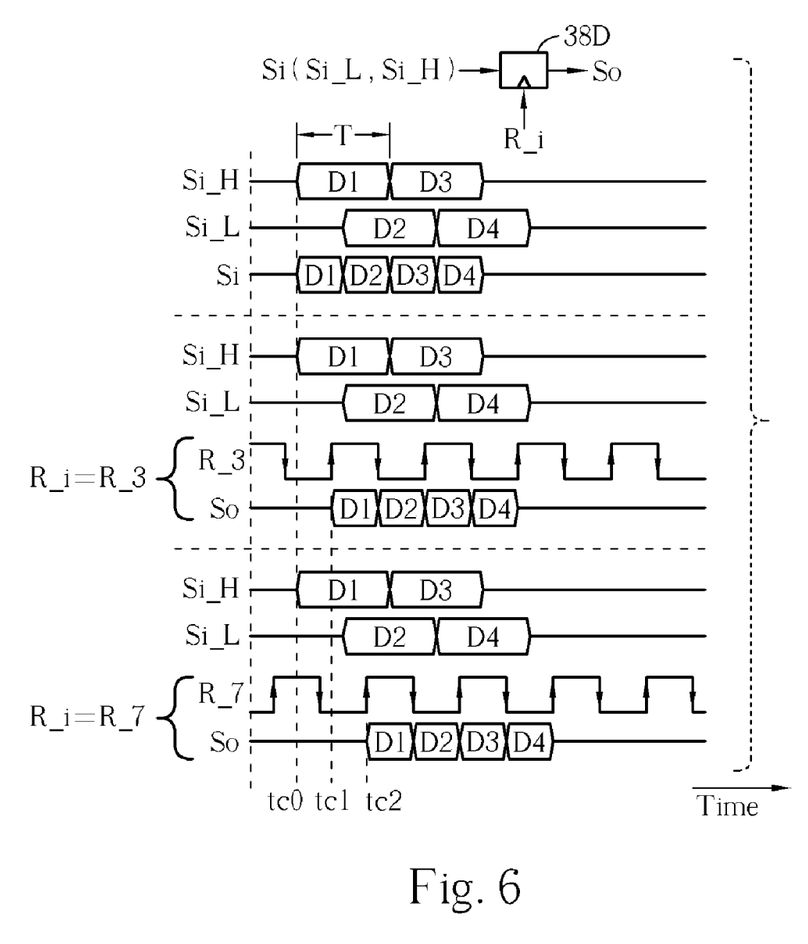

Please refer to FIG. 6 (in conjunction with FIGS. 3, 4). FIG. 6 shows the operation of the adjusting unit 38D. The adjusting unit 38D also receives a reference signal R_i to sample the input signal Si according to the reference signal R_i in order to adjust the timing of the input signal so that the output signal So is formed. As shown in FIG. 6, when the adjusting unit 38D operates, the input signal Si can comprise two signals Si_H and Si_Furthermore, the two signals Si_H and Si_L have a half period T between the two signals, and respectively carry data (for example, the signal Si_H carries data D1 and D3, and signal Si_L carries data D2 and D4), whose period is T. Therefore, the two signals Si_H and Si_L can both form an input signal Si, whose period is T/2. When the adjusting unit 38D is triggered by the reference signal R_i, the adjusting unit 38D samples the signal Si_H in the rising edge of the reference signal R_i, samples the signal Si_L in the falling edge of the reference signal R_i (or in the rising edge of another reference signal having a 180 degrees phase difference between the reference signal R_i), and generates the output signal So according to the sampling results.

For example, when the reference signal R_i is the reference signal R_3 shown in FIG. 4, the rising edge of the reference signal R_3 triggers the adjusting unit 38D at time tc1 to start sampling the data D1 of the signal Si_H. Then the falling edge of the reference signal R_3 triggers the adjusting unit 38D to sample the data D2 of the signal Si_L. In addition, the adjusting unit 38D assembles the sampled data into the corresponding output signal So. As shown in FIG. 6, when the adjusting unit 38D is triggered by the reference signal R_3, the output signal So is equivalent to the result of delaying the input signal Si from time tc0 to time tc1. Similarly, if the adjusting unit 38D is triggered by the reference signal R_7, the output signal So is equivalent to the result of delaying the input signal Si from time tc0 to time tc2. In other words, even if the input signal Si carries data/information whose period is T/2, the present invention can still utilize the reference signals to adjust the timings.

Figure 7:
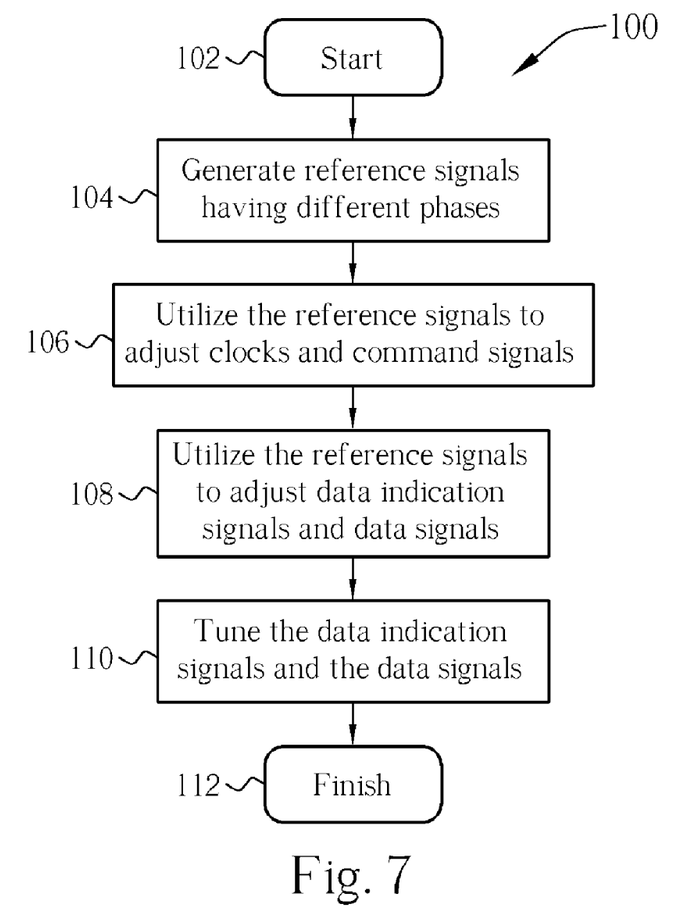
FIG. 7 is a flow chart illustrating the chipset shown in FIG. 3 performing the memory signals adjustments.

Similar to the adjusting units 38B and 38D shown in FIGS. 5, 6, the adjusting units 38A and 38C can utilize similar methods to adjust the timings of the clock DCLKi and the data indication signal DQSi according to each reference signal and then generate the clock DCLK and the data indication signal DQS. Please refer to FIG. 7 (in conjunction with FIGS. 1, 3). FIG. 7 is a flow chart of the flow 100 illustrating the chipset 20 shown in FIG. 3 performing memory signal adjustments. The flow 100 comprises the following steps:

Step 102: Start. The flow 100 can be performed when the computer system 10 (shown in FIG. 1) adjusts the corresponding timings of the memory signals.

Step 104: Utilize the clock generator 24 (here the clock generator can be a PLL) to generate a plurality of reference signals R_1, R_2, ..., R_N, all having the same frequency but different phases.

Step 106: Select an appropriate reference signal to adjust the timings of the clock DCLKi and the command signal CMDi to make the corresponding output clock DCLK and the corresponding command signal CMD have a correct timing relationship. When the computer system 10 is booting, the memory arrangement is detected to see if the same bus (channel) comprises memory modules, what type of memory module is placed, etc. Then, according to the memory arrangement, the equivalent circuit load, caused by the memory arrangement to the chipset, is determined, and the influences on timings of the memory signals are also determined. When the step 106 is performed, the detecting module 28 (shown in FIG. 3) of the chipset 20 can evaluate which reference signal is utilized according to the detecting result of the memory arrangement, and correspondingly set the setting modules 34A and 34B to control corresponding multiplexer units 36A and 36B in order to select an appropriate reference signal. Therefore, the adjusting units 38A and 38B can adjust the timings of the clock DCLKi and the command signal CMDi to compensate for the timing influences of the memory arrangement according to the reference signals. In the real implementation, the chipset provider can first test the influences of different memory arrangements and evaluate which corresponding reference signal has to be utilized. Therefore, the detecting module 28 can directly check a look-up table, which is established by the above-mentioned chipset provider, to select a correct reference clock according to the actual memory arrangement. This helps the adjusting module 28 to adjust the timings of the clock DCLK and the command signal CMD.

Figure 8:
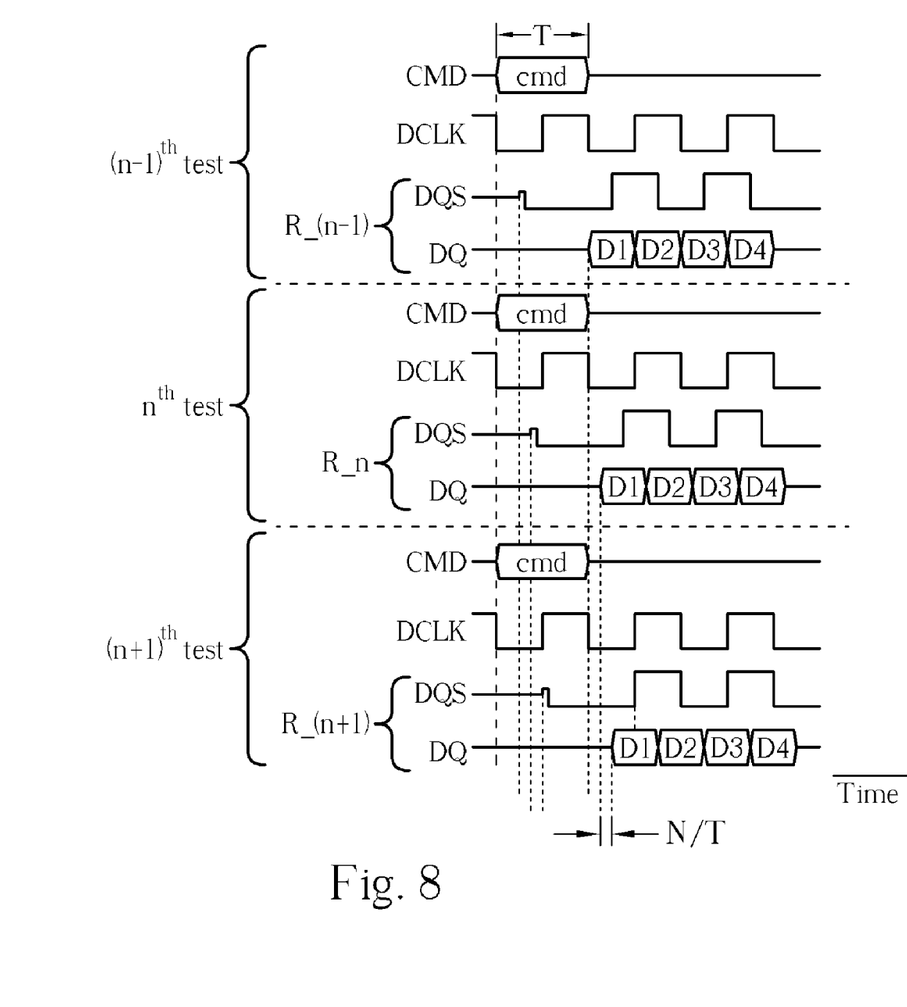
FIG. 8 is a diagram illustrating the related tests shown in FIG. 7 performing according to the present invention.

Step 108: After adjusting the timings of the clock DCLK and the command signal CMD, the two signals can be utilized as a reference to adjust the timings of the data indication signal DQSi and the data signal DQi. This makes the outputted data indication signal DQS/data signal DQ and the clock DCLK/command signal CMD have a good timing relationship. When performing step 108, the scanning module 32 first utilizes the setting modules 35C and 35D to fix the delay time of each delay line 40A and 40B, and controls the multiplexer units 36C and 36D to select the same reference signal to adjust the timings of the data indication signal DQSi and the data signal DQi. Then the control module 30 can send a command (through the clock DCLK and the command signal CMD) to the memory, write specific data into the memory in coordination with data indication signal DQS/data signal DQ, and read the written data from the memory. The comparing module 26 can compare the read data with the data to be written. If the read data does not comply with the data to be written, this represents that the timings of the data indication signal DQS/data signal DQ can not co-ordinate correctly with the timings of the clock DCLK/command signal CMD so the data is incorrectly written. At this time, the scanning module 32 can utilize another reference signal to adjust the timings of the data indication signal DQS/data signal DQ again, and write the data into the memory again to test if the reference signal works. If the read data complies with the data to be written, this represents that the reference signal works. In other words, the reference signal can make the timings of the data indication signal DQS/data signal DQ co-ordinate with the timings of the clock DCLK/command signal CMD. As mentioned above, after the clock DCLK/command signal CMD triggers the memory module to receive a write-in command, the data to be written have to be transferred into the memory module in a fixed time. An early transmission or a late transmission may cause a failure. Therefore, according to the above-mentioned read/written tests, we can determine whether the timings of the data indication signal DQS/data signal DQ can co-ordinate with the timings of the other memory signals. In addition, when performing step 108, the scanning module 32 can orderly select all N reference signals. In other words, the scanning module 32 can test according to all reference signals, that is, the scanning module 32 can utilize all reference signals to see if the adjusted data indication signal DQS/data signal DQ makes the data write/read smoothly. Please refer to FIG. 8, which is a diagram illustrating the scanning module 32 orderly performing $(N-1)_{th}$, $N_{th}$, $(N+1)_{th}$ write/read tests according to the present invention. The scanning module 32 orderly performs these tests, but because of comparison of these tests, the timings of related signals of all the tests are shown in parallel in FIG. 8. When orderly performing these tests, the scanning module 32 respectively utilizes the reference signals R_(n-1), R_n, and R_(n+1) to adjust the timings of the data indication signal DQS/data signal DQ, and controls the memory module to receive the data D1-D4 in coordination with the command cmd of the command signal CMD. As shown in FIG. 8, through different reference signals, the timings of the data indication signal DQS/data signal DQ are delayed increasingly. The timing difference of the data indication signal DQS/data signal DQ between two tests is equal to N/T.

After the above-mentioned tests, the scanning module 32 can select a better reference signal according to the test results, and set the setting modules 34C and 34D according to the better reference signal so that the multiplexer modules 36C and 36D can fixedly utilize the better reference signal in the following operation.

Step 110: Utilize the delay lines 40A and 40B to tune the timings of the data indication signal DQS/data signal DQ. In the embodiment of FIG. 3, the present invention utilizes the delay lines 40A and 40B to respectively delay the reference signal selected by the multiplexer units 36C and 36D. Furthermore, the delay time injected by the delay lines 40A and 40B influences the data indication signal DQS/data signal DQ through the adjusting units 38C and 38D. Similar to step 108, the scanning module 32 can orderly select different parameters to set the programmable delay lines 40A and 40B so that the delay lines 40A and 40B can orderly provide different delay times. In addition, the scanning module 32 can perform a test of writing/reading data according to each delay time, and tune the timings of the data indication signal DQS/data signal DQ according to the test results. In other words, the scanning module 32 can select a better delay time and utilize this better delay time to set the setting modules 35C and 35D. This makes all the memory signals (including the clock DCLK, the command signal CMD, the data indication signal DQS, and the data signal DQ) have better (fine-tuned) timing relationships.

Step 112: Finish the operation of adjusting timings and complete the boot procedure of the computer system 10. Then, the chipset 20 can utilize the better parameters set by the setting modules to control the multiplexer units, the delay lines to select a better reference signal and the delay times to adjust timings of the memory signals. This ensures the memory signals have better(proper) timing relationships in the following operation of the computer system.

To sum up, the present invention utilizes a plurality of reference signals, all having the same frequency but different phase to adjust the memory signals. In contrast to the prior art of utilizing the delay lines, the present invention not only can efficiently prevent the delay time shift (errors) of the delay lines, but can also reduce the jitter phenomenon injected by the delay line. Although the present invention also utilizes the delay lines, the present invention reduces the delay time injected by the delay lines. Actually, the delay time injected by the delay lines can be less than T/N (where T is the period of the clock DCLK and N is the number of the reference signals). In the present invention, because the delay time difference caused by the phase difference of the reference signals is T/N, if the delay time is larger than T/N, another reference signal can be selected to compensate the delay time, so that the delay time can be limited to be less than T/N. In other words, because the present invention is based on the timing adjustment of the reference signals, the timing adjustment does not depend on the delay lines as much as the prior art. Furthermore, the present invention can be widely utilized in the timing adjustment of other serial control circuits. Please note that the modules and adjusting units shown in FIG. 3 can be accomplished through hardware or firmware; for example, the functions of the control module, the comparing module, the detecting module, and the scanning module can be accomplished through the same controller, and the adjusting units can be accomplished through a logic circuit of hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting timing of signals, the method comprising:
    generating a plurality of reference signals, all having the same frequency but different phase;
    selecting a first reference signal from the reference signals;
    adjusting a first signal output delay time according to the first reference signal to output a delayed first signal;
    selecting a second reference signal from the reference signals;
    adjusting a second signal output delay time to output a delayed second signal;
    sending a command to a memory according to the delayed first signal; and
    writing specific data into the memory in co-ordination with the delayed second signal.

2. The method of claim 1 further comprising:
    fixing a delay time for tuning the second signal output delay time.

3. The method of claim 1 further comprising:
    reading the specific data that have been written in the memory; and
    comparing the read specific data with specific data to be written.

4. The method of claim 3 further comprising:
    if the read specific data do not correspond to the specific data to be written,
    reselecting the second reference signal.

5. The method of claim 4, wherein the method is capable of detecting a computer system memory signal, and the first signal is a bus transferring signal (DCLK) or a command signal (CMD).

6. The method of claim 5, wherein the second signal is a data indication signal (DQS) or a data signal (DQ).

7. The method of claim 1, wherein the method is capable of being utilized for adjusting timings of memory signals of a computer system, and the method further comprises:
    selecting the first reference signal from the reference signals according to memory arrangements of a computer system when the computer system is turned on.

8. The method of claim 7 further comprising:
    establishing a look-up table having relationships between the memory arrangements and the first reference signal.

9. A method for adjusting timings of memory signals of a computer system, the method comprising:
    generating a plurality of reference signals, all having the same frequency but different phase;
    selecting a first reference signal from the reference signals:
    adjusting a first signal output delay time according to the first reference signal to output a delayed first signal;
    adjusting a second signal output delay time according to a second reference signal to output a delayed second signal;
    selecting the first reference signal according to memory arrangements of the computer system when the computer system is turned on; and
    establishing a look-up table having relationships between the memory arrangements and the first reference signal.

10. The method of claim 9, wherein the first signal is a bus transferring signal (DCLK) or a command signal (CMD).

11. The method of claim 10, wherein the second signal is a data indication signal (DQS) or a data signal (DQ).

12. The method of claim 11 further comprising:
    sending a command to the memory according to the delayed bus transferring clock and the command signal; and
    coordinating the delayed data indication signal and the data signal to write specific data into the memory.

13. The method of claim 12 further comprising:
    reading the specific data that have been written in the memory; and
    comparing the read specific data with specific data to be written.

14. The method of claim 13 further comprising:
    if the read specific data does not correspond to the specific data to be written, reselecting the second reference signal.

15. The method of claim 9 further comprising:
    fixing a delay time for tuning the second signal output delay time.

16. method for adjusting timing of signals, the method comprising:
    generating a plurality of reference signals, all having the same frequency but different phase;
    selecting a first reference signal from the reference signals; and
    adjusting a first signal output delay time according to the first reference signal to output a delayed first signal;

wherein the method is capable of being utilized for adjusting timings of memory signals of a computer system, and the method further comprises: selecting the first reference signal from the reference signals according to memory arrangements of a computer system when the computer system is turned on; and establishing a look-up table having relationships between the memory arrangements and the first reference signal.

* * * * *